United States Patent [19]

Apperson et al.

[11] Patent Number: 4,969,616
[45] Date of Patent: Nov. 13, 1990

[54] LOW PROFILE SIDE OPENING STRAIGHT LINE DEAD END CABLE CLAMP

[75] Inventors: Kenneth P. Apperson, Pinson; William N. Parrott; Jerald C. Todd, both of Birmingham, all of Ala.

[73] Assignee: Square D Company, Palatine, Ill.

[21] Appl. No.: 266,454

[22] Filed: Nov. 2, 1988

[51] Int. Cl.$^5$ ............................................. F16L 3/00
[52] U.S. Cl. .................................... 248/63; 24/135 N
[58] Field of Search ............... 248/62, 67.5, 74.4, 248/74.5, 231.5, 231.6, 316.5, 316.6, 63; 24/132 WL, 132 R, 135 R, 135 A, 135 L, 135 N; 403/344, 302, 311, 312; 174/40 R, 79; 439/804

[56] References Cited

U.S. PATENT DOCUMENTS

| | | | |
|---|---|---|---|
| 1,624,399 | 4/1927 | Ellis | 24/135 L |
| 2,471,306 | 5/1949 | Card | 24/135 A |
| 2,884,476 | 4/1959 | Lock | 174/79 |
| 2,946,108 | 7/1960 | Bethea | 24/135 L |
| 2,997,764 | 8/1961 | Lantz . | |
| 2,999,224 | 9/1961 | Kraase | 439/804 |
| 3,274,654 | 9/1966 | Becker | 24/132 WL |
| 3,470,528 | 9/1969 | Farrington, Jr. . | |
| 3,602,956 | 9/1971 | Eddens . | |
| 4,383,668 | 5/1983 | Hall . | |
| 4,719,672 | 1/1988 | Apperson | 24/135 R |

OTHER PUBLICATIONS

Bethea Hardware, "Hot Line Strain Clamps", 4-1984, Section A, p. 17.

*Primary Examiner*—Ramon O. Ramirez
*Assistant Examiner*—Robert A. Olson
*Attorney, Agent, or Firm*—Nicholas A. Camasto

[57] ABSTRACT

A straight line, side opening dead end cable clamp includes a pivotally mounted keeper that is spring loaded on the cable clamp body to urge the keeper into an open position. The body of the clamp has a very low profile permitting it to be formed in a mold that has a straight parting line. A cable receiving groove is formed in the body at an angle to bring the axis of the cable in line with the supporting clevis. The keeper has an elongated cable compression member that is maintained in alignment with the cable receiving groove. A single and a double U bolt design are disclosed. The compressive force applied to the cable by the cable compression member and the cable supported groove in the body is maximum at the supportive end of the clamp and minimum at the mouth of the clamp. A double loop spring member couples the keeper to the body and urges the keeper to an open position to permit access to the cable receiving groove.

7 Claims, 6 Drawing Sheets

LOW PROFILE SIDE OPENING STRAIGHT LINE DEAD END CABLE CLAMP

BACKGROUND OF THE INVENTION AND PRIOR ART

This invention relates generally to cable clamps for clamping electrical cables in overhead transmission lines and particularly to a low cost side opening cable clamp that is simple to manufacture and easy to use.

Power line installation and maintenance crews prefer cable clamps that can be installed without removing the clamping hardware or cutting the associated cable. Side opening cable clamps are available in two different types, commonly referred to as a straight line type and a quadrant type. The straight line type is preferred, especially when the clamp is being installed on an energized high voltage overhead line, since it is much simpler to manipulate and doesn't require disassembly of the clamp or cutting of the cable. Preferably, a cable clamp should be relatively simple to install and have captivated parts which can not be disengaged from the clamp during installation.

In a conventional straight line, side opening cable clamp, a body is provided with a cable receiving means or groove, a keeper to enable the cable to be physically clamped in the cable receiving groove, one or more U bolts to secure the keeper to the body, a clevis for attaching the cable clamp to a supporting structure, such as a power insulator string, and a pulling eye to tension the cable in position in the cable receiving groove prior to clamping the cable with the keeper.

U.S Pat. No. 4,383,668 discloses a side opening cable clamp having a pair of captivated U bolts for securing a keeper that is normally urged to a position away from a cable supporting groove by means of a pair of guide rails and a compression spring. The guide rails extend upwardly from the edges of the cable supporting groove in the body and essentially balance the keeper over the cable during installation. The keeper movement is restrained to a straight line path by the guide rails. To avoid friction problems, which can result in variable clamping forces on the cable, the U bolts must be alternately tightened. Thus the lineman needs to shift from one U bolt to the other a number of times during the installation. This becomes burdensome when using long handled hot line tools to install a clamp on an energized high voltage power line. Of even more importance is the fact that the spring encircles an upstanding post in the body and nests in a deep recess in the keeper. The post, the recess and the guide rails are difficult to cast in a mold and render the clamp design considerably less attractive from an economic standpoint.

U.S. Pat. No. 3,470,528 discloses a side opening dead end clamp in which the keeper may be swung out, pivoting on one U bolt leg, to expose the cable supporting groove of the cable clamp. This clamp does not include means for automatically opening the clamp, which is a very desirable feature, especially when the cable clamp is being installed on an energized transmission line. The pattern of movement of the keeper is somewhat complicated and the clamp is consequently comparatively difficult to install.

U.S. Pat. No. 2,997,764 discloses a quadrant type cable clamp in which the keeper is pivotally mounted to the body by means of a wire loop spring that serves to automatically open the clamp as the U bolt is released. Quadrant type clamps are much more difficult to install because the cable must be manipulated around the clamp. This means that the cable must either be cut and fed through the clevis or the clevis pin removed from the clamp.

Cable clamps as described above are conventionally used to clamp ACSR type cable that is composed of multiple strands of aluminum wire wound over a center core of one or more galvanized steel strands. A typical failure mode of such cable clamps is that the interior steel core of the ACSR cable will slip in time, which causes breaking of the outer aluminum strands. In U.S. Pat. No. 3,602,956, a suspension type cable clamp mechanism is disclosed in which the forces exerted by the keeper on the cable are examined. The thrust of the patent is that the compressive force on the cable should be moderated in accordance with the tension force in the cable to preclude the development of excessive shear stress in portions of the cable.

A straight line, side opening, single U bolt cable clamp, that is generally constructed like the two U bolt version discussed in the '688 patent, is commercially available. In it, the keeper movement is confined to a straight line by the guide rails opposite the cable supporting groove. While it is self-opening, the shortcomings described above with respect to the 688 patent clamp parting line still exist. Further as the single U bolt is tightened to secure the cable, the keeper is caused to bear heavily against the rails. This results in a frictional force on the keeper that can greatly reduce the actual clamping force that is applied to the cable. A wax lubricant is placed on the rails by the manufacturer to limit this friction. The wax lubricant is however subject to removal before the clamp is installed and consequently there is a significant variability in the holding power of the clamp. Further, the lubricant is eventually lost due to exposure to the elements and limits the reusability of the clamp.

The present invention cable clamp is a novel straight line, side opening device that incorporates features of the above prior art cable clamps in a unique way to produce a clamp that; is readily manufacturable at low cost, easy to install under energized line conditions, avoids overstressing the cable, and provides better reliability.

OBJECTS OF THE INVENTION

A principal object of the invention is to provide an improved straight line, side opening cable clamp.

Another object of the invention is to provide a straight line, side opening cable clamp that is economical to manufacture.

A further object of the invention is to provide a novel straight line, side opening cable clamp that is easier to install.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
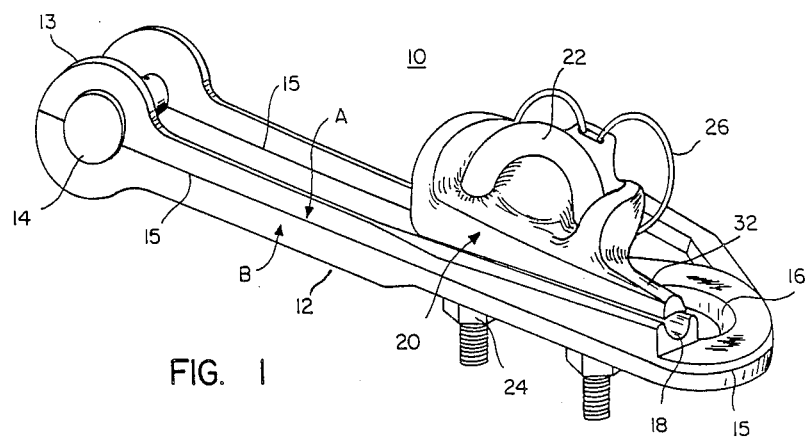
FIG. 1 is top perspective view of a straight line, single U bolt, side opening cable clamp constructed in accordance with the invention.

As mentioned, the straight line cable clamp of the invention has two basic embodiments, generally characterized as a single U bolt and double U bolt version. The single U bolt version of the cable clamp is shown in FIG. 1 in which a straight line, side opening cable clamp 10 includes a body 12, preferably cast of aluminum, that is formed with a clevis 13 at one end, through which a clevis pin 14 may be inserted for supporting the clamp to a supporting structure (not shown), and a pulling eye 16 at the other end. It should be noted that body 12 exhibits a low profile and may be readily molded in a mold having a straight parting line. This feature is indicated throughout the drawings by a parting line 15 on the body. The body 12 is preferably molded with one die shaping upper body portion A and another die shaping lower body portion B, with the dies having a straight line interface. This feature contributes significantly to the cost effectiveness of the inventive design.

Figure 2:
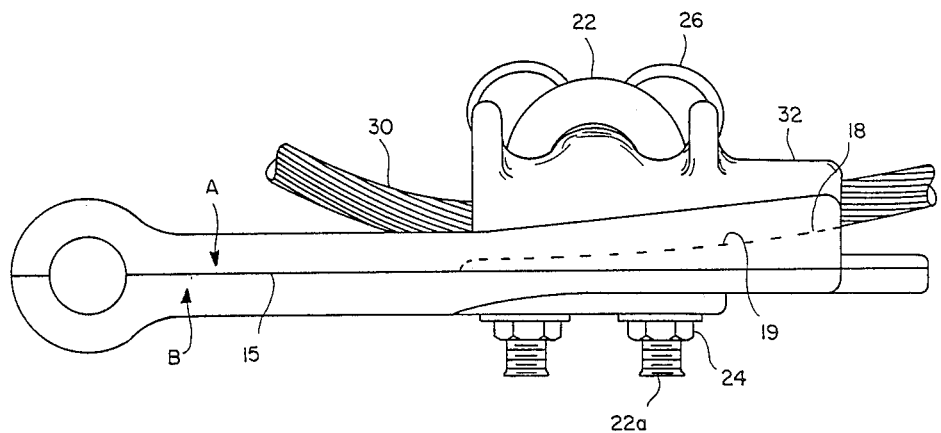
FIG. 2 is a side elevation of the cable clamp of FIG. 1 with a cable installed.

Body 12 includes a longitudinal cable receiving means 18, in the form of a smooth cylindrical cable supporting or receiving groove, that is upwardly angled at about five degrees to parting line 15 to keep the cable force in line with the clevis pin. This is best shown in FIG. 2 where a cable 30 is secured between the cable receiving means 18 and a pivotally mounted keeper 20 that has an elongated cable compression member 32 extending in alignment with cable receiving means 18. A U bolt 22, positioned parallel to cable compression member 32, includes nuts 24 for securing keeper 20 to body 12 and to compress cable 30 between cable compression member 32 and cable receiving means 18. The base of the cable receiving means 18 is denoted by a dashed line 19, which clearly indicates the upward angle formed with parting line 15. The underside of cable compression member 32 is tapered at a similar angle to be substantially parallel to cable receiving means 18. A double loop wire spring 26 serves to both secure keeper 20 for pivotal movement with respect to body 12 and to exert an opening force on keeper 20, as will be explained. It will be appreciated that the straight parting line is maintained in conjunction with keeping the cable force in line with the clevis pin by forming the cable receiving groove wholly within one half of the mold that forms the cable body at an upward angle.

Figure 3:
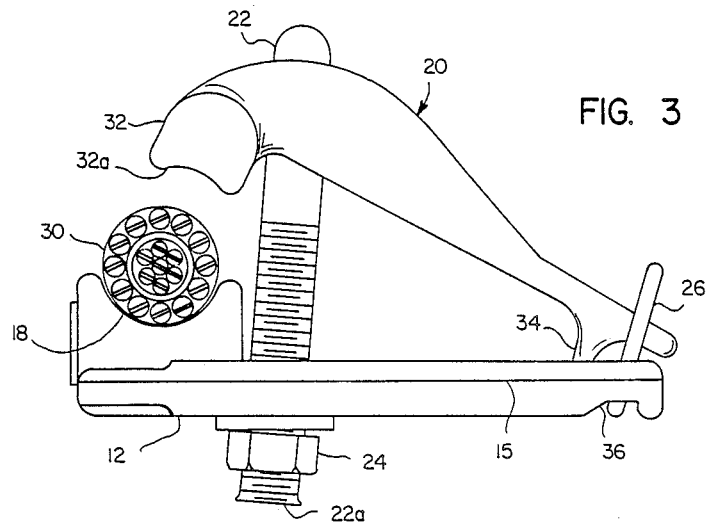
FIG. 3 is a partial end view of the FIG. 1 cable clamp in position.

FIG. 3 shows an end view of the cable clamp in its open or cable receiving position. Keeper 20 has a pivot 34 located away from cable compression member 32. Pivot 34 rests within an elongated pivot recess 40 formed in body 12 (FIG. 6) and keeper 20 is urged in a pivotal direction away from cable receiving means 18 by virtue of spring member 26, the ends of which bear on the bottom of an elongated spring end recess 38 (FIG. 4) formed in keeper 20. Spring member 26 has a straight portion that is positioned in a recess 36 in the underside of body 12. Keeper 20 is captivated to body 12 by U bolt 22, which has its ends 22a distorted to prevent the nuts 24 from being removed. This prevents the nuts from being lost and the U bolt from becoming disengaged. Consequently, there are never any loose parts to contend with. This is a critical factor when installing a cable clamp on an energized high voltage power line long-handled hot line tools. The underside of cable compression member 32 is generally concave-shaped (as at 32a) to assist in distribution of the clamping force on cable 30. Cable 30, is of the ASCR type and includes a plurality of outer aluminum strands around a plurality of steel strands.

Keeper 20 in FIG. 3 is configured such that the compressive load applied by U bolt 22 is carried primarily by cable compression member 32 and secondarily by pivot 34. In practice, the loading of pivot 34 is less than 30 percent of the total clamp loading. This permits a less stressful design for pivot 34 and pivot recess 40 in body 12. As will be seen, the pivot in the double U bolt cable clamp carries zero load, because the U bolts, which are positioned on either side of the cable compression member, are torqued equally.

Figure 4:
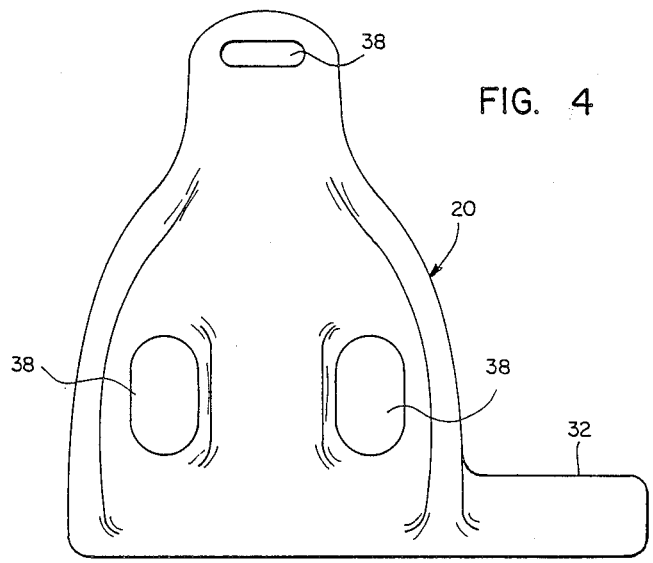
FIG. 4 is a plan view of the keeper for the cable clamp of FIG. 1.
Figure 5:
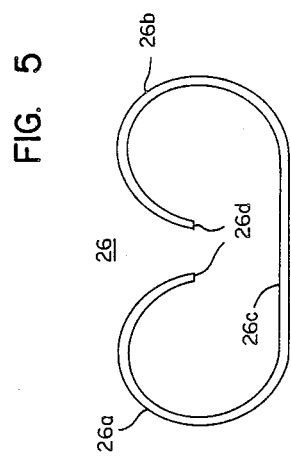
FIG. 5 shows a double loop spring used with the invention.

FIG. 4 is a plan view of keeper 20 and shows the elongated holes 38 which enable the legs of U bolt 22 to laterally move therein and permit the pivotal opening movement of keeper 20. Spring end recess 38 is formed in the tail portion of keeper 20 for receiving the ends of spring member 26, best illustrated in FIG. 5. Spring member 26 includes a pair of loops 26a and 26b interconnected by straight portion 26c and terminating in free ends 26d. The straight portion 26c nests in recess 36 in body 12 and free ends 26d bear on the bottom of recess 38 in keeper 20. Double loop spring member 26 enables a large force to be exerted in a relatively small space. Spring member 26 is preferably made of stainless steel to withstand the environmental conditions during the long service life of the cable clamp.

Figure 6:
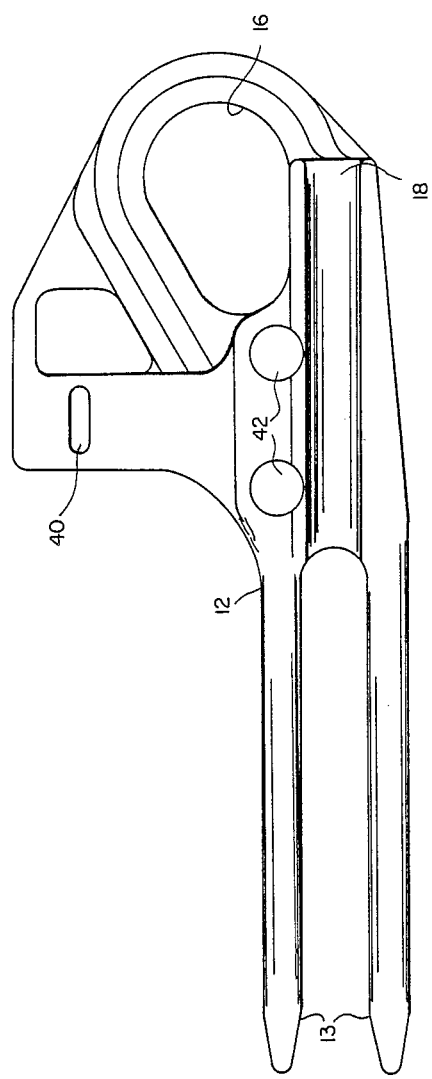
FIG. 6 is a plan view of the body of the cable clamp of FIG. 1.

FIG. 6 is a plan view of the body 12 of the cable clamp illustrating pivot recess 40 for receiving pivot 34 of keeper 20 and a pair of holes 42 for passage of the legs of U bolt 22. The body and the keeper are preferably cast of aluminum and may be sized to meet the strength requirements of the particular installation. It is of course envisioned that other than ACSR cable may be used with the invention. All aluminum cable and aluminum core cable may be used also. Similarly the body and keeper may be formed from cast bronze or galvanized cast iron as the application requires.

Reverting to FIG. 2, it will be seen that, because of the keeper configuration and placement of U bolt 22, the primary clamping force exerted on the cable is toward the support or clevis end of cable receiving means 18 and cable compression member 32. This arrangement develops a minimum compressive stress in cable 30 at the mouth of cable receiving means 18 where the tension in cable 30 is a maximum and provides progressively greater compressive stress in the cable toward the end of cable receiving means 18 where the tension is zero. This precludes excessive shear stresses in portions of the cable near the mouth of the clamp which might lead to early failure. Similarly, concentrating compression forces toward the rear of clamp receiving means 18 causes the aluminum in the exterior strands of the ACSR cable to yield and flatten and permits a greater proportion of the compressive force exerted by cable compression member 32 and cable receiving means 18 to be applied to the interior steel core of the cable. The upwardly angled cable receiving means eliminates kinking of the cable at the mouth of the clamp because the cable force is in line with the supporting clevis pin. The cable clamp body design eliminates interior rails and deep or narrow pockets. This facilitates both the tooling of the mold patterns and the molding process. Specifically, parting line flash is minimized and easier to remove and the finished parts are readily removable from the mold. These factors are of great economic significance.

Figure 7:
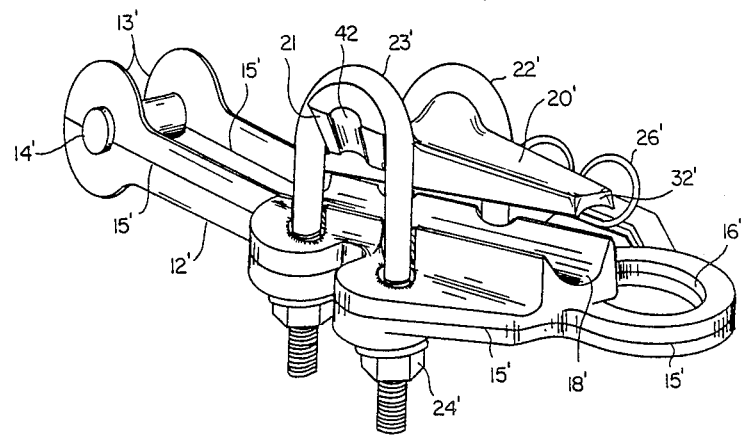
FIG. 7 is a top perspective view of a straight line, double U bolt, side opening cable clamp constructed in accordance with the invention.
Figure 8:
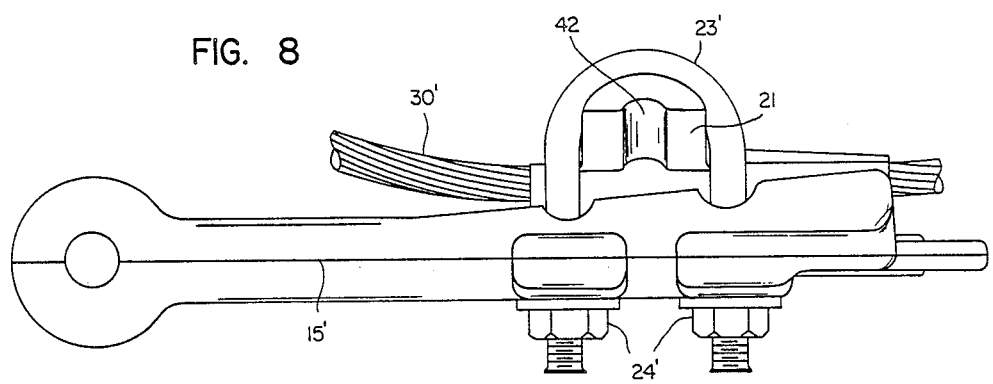
FIG. 8 is a side elevation of the clamp of FIG. 7 with a cable installed.

The double U bolt version of the straight line, side opening cable clamp of the invention is illustrated in the top perspective view of FIG. 7. Primed reference numerals indicate parts that are functionally the same but structurally somewhat different from their unprimed counterparts. Body 12' is seen to include a clevis 13' at one end and a pulling eye 16' at the other. A clevis pin 14' is shown inserted through clevis 13'. A parting line 15' illustrates the straight parting line construction permitted in the mold. Cable receiving means 18', generally comprising a cable supporting groove is formed in body 12'. A keeper 20' is positioned over cable receiving means 18' and secured to the body by a pair of U bolts 22' and 23', both of which are captivated to body 12'. The U bolts are positioned parallel to, and on either side of cable compression member 32'. As will be discussed, keeper 20' is also pivotally mounted to body 12' and spring biased to it to urge it to an open position, i.e. with cable compression member 32' displaced from cable receiving means 18'.

With further reference to FIGS. 8, 9, 10 and 11, keeper 20' includes an upwardly angled cam surface 21 in which is formed a groove 42. Surface 21 underlies a circular groove 46 in which the bight of U bolt 23' rests when cable compression member 32' is being urged into contact with cable 30'. A retention projection 44 on keeper 20' precludes U bolt 22' from slipping off the keeper, which does not include holes for the U bolts. A pivot 34' formed on the underside of keeper 20' is secured in an elongated recess 40' in body 12' (FIG. 11) and keeper 20' is urged to its open position by the action of spring member 26'. As with the single U bolt version of the invention, the ends of spring member 26' bear on the bottom of an elongated recess 38' on the upper surface of keeper 20' as shown. The placement of cable receiving means 18' with respect to the axis of body 12' is as described for the single U bolt version of the invention. Specifically, the surface of cable receiving means 18' is inclined at approximately five degrees to parting line 15'. Four elongated holes 42' are provided in body 12' for passage of U bolts 22' and 23'.

Figure 9:
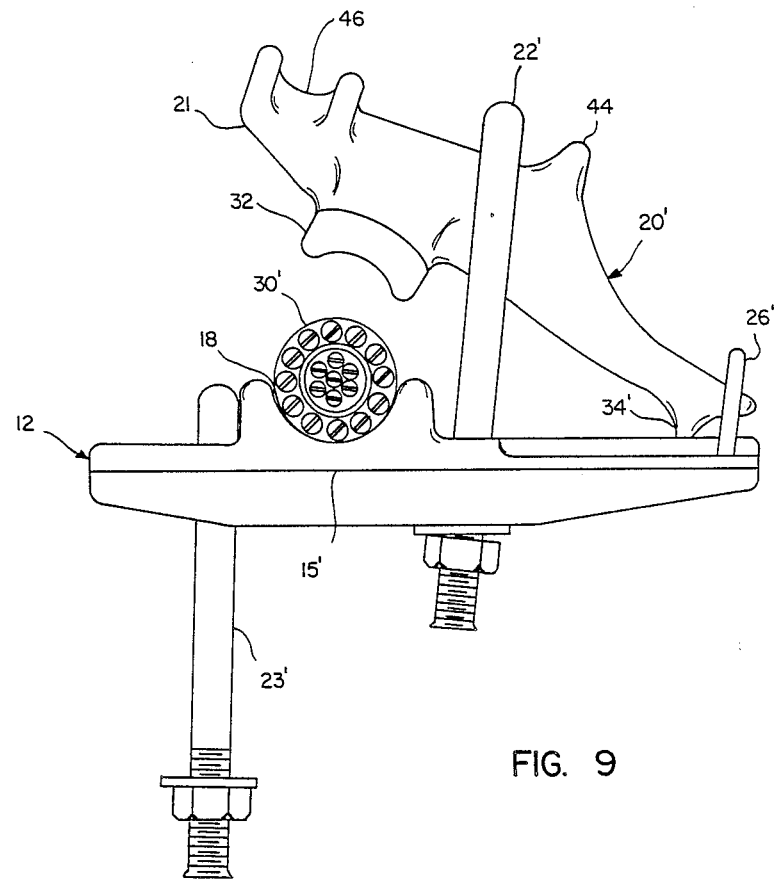
FIG. 9 is an end view of the cable clamp of FIG. 7 in the open position.
Figure 10:
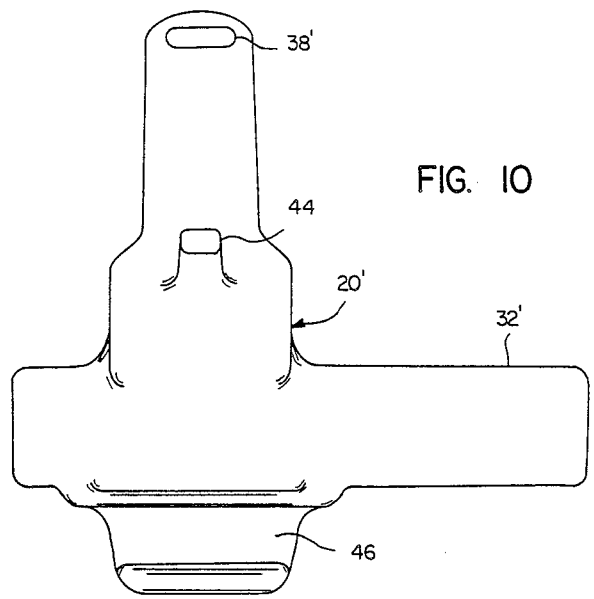
FIG. 10 is a plan view of the keeper of the cable clamp of FIG. 7.
Figure 11:
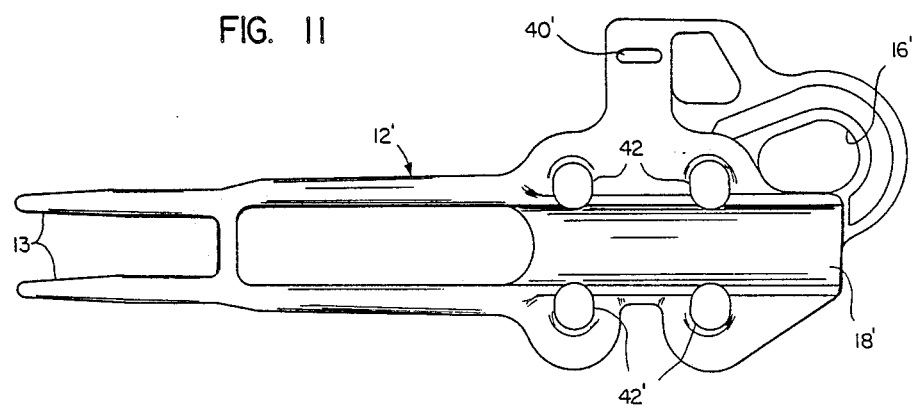
FIG. 11 is a plan view of the body of the cable clamp of FIG. 7.

The operation of the double U bolt version of the invention is best described with reference to FIG. 9. With the cable clamp in position on the supporting structure, and with U bolt 23' in the illustrated disengaged position, cable 30' may be readily positioned in cable receiving means 18'. U bolt 22' is then torqued to specification, thus clamping cable 30' between the cable compression member 32' on keeper 20' and the cable receiving means 18' in body 12'. U bolt 23' is lifted into position with an appropriate hot line tool (not shown) and is cammed along cam surface 21, (with the tool hook guided by groove 42) until the bight of the U bolt can be slipped over the end of keeper 20' and into groove 46. The nuts on U bolt 23' are tightened to specification to complete the installation.

It should be particularly noted that the lineman needs only to tighten each U bolt once, rather that going back-and-forth between them to assure proper clamping. This attribute of the low profile clamp is an important aspect of the invention.

It is recognized that numerous changes in the described embodiment of the invention will be apparent to those skilled without departing from its true spirit and scope. The invention is to be limited only as defined in the claims.

What is claimed is:

1. In a straight line, side opening cable clamp including a body defining a cable receiving means and having a clevis at one end for pivotal connection to a supporting structure and a pulling eye at the other end;
   keeper means having an elongated cable compression member aligned with said cable receiving means and a pivot spaced from said cable compression member;
   spring means pivotally mounting said keeper means to said body adjacent said pivot and urging said keeper means to a position whereat said cable compression member is displaced from said cable receiving means;
   U bolt means embracing said keeper means and positioned parallel to said cable compression member for captivating said keeper means to said body;
   said U bolt means and said spring means confining said keeper means to limited arcuate movement relative to said cable receiving means with said cable compression member being parallel to said cable receiving means;
   said body being of molded construction and formed from a mold having a straight parting line, said cable receiving means being inclined to substantially axially align a cable therein with said clevis, and
   wherein said U bolt means applies maximum compressive force to said cable at the end of said elongated cable compression member that is closest to said clevis.

2. The cable clamp of claim 1, wherein said U bolt means includes first, and second U bolts on opposite sides of said cable receiving means, said second U bolt being movable from an engaged position overlying said keeper means to a disengaged position permitting access to said cable receiving means for insertion or removal of a cable.

3. The cable clamp of claim 2 wherein said cable receiving means is inclined at about a five degree angle with respect to said parting line.

4. In a straight line, side opening cable clamp including a body defining a cable receiving groove and having a clevis at one end for pivotal connection to a supporting structure and a pulling eye at the other end;
   a keeper including an elongated cable compression member aligned with said cable receiving groove and a pivot spaced from said cable compression member;
   a spring pivotally mounting said keeper to said body adjacent said pivot and urging said keeper to an open position with said cable compression member displaced from said cable receiving groove to permit access to said cable receiving groove for insertion or removal of a cable;

a U bolt engaging said keeper and positioned parallel to said cable compression member and cooperating with said spring to captivate said keeper to said body;

said U bolt and said spring confining said keeper to limited arcuate movement relative to said cable receiving groove with said cable compression member being parallel to said cable receiving groove throughout said movement;

said body being of molded construction and formed from a mold having a straight parting line, said cable receiving groove being inclined to substantially axially align a cable therein with said clevis; and said U bolt applying maximum compressive force to said cable at the end of said elongated cable compression member that is closest to said clevis.

5. The cable clamp of claim 4, wherein there are first and second U bolts, said first U bolt being positioned between said cable receiving groove and said pivot and said second U bolt being positioned on the opposite side of said cable receiving groove, said second U bolt being movable from an engaged position overlying said keeper to a disengaged position permitting access to said cable receiving groove for insertion or removal of a cable.

6. The cable clamp of claim 5 wherein said cable receiving groove is inclined at about a five degree angle with respect to said parting line.

7. In a straight line, side opening cable clamp including a cast aluminum body defining a cable receiving groove and having a clevis at one end for pivotal connection to a supporting structure and a pulling eye at the other end, said cable receiving groove being inclined to substantially axially align a cable therein with said clevis;

a cast aluminum keeper including an elongated cable compression member aligned with sad cable receiving groove and a pivot spaced from said cable compression member;

a wire spring, having a planar configuration including a pair of loops joined by a straight portion, pivotally mounting said keeper to said body adjacent said pivot and urging said keeper to an open position with said cable compression member displaced from said cable receiving groove to permit access to said cable receiving groove for insertion or removal of a cable, the ends of said wire spring loops bearing down on said keeper, and the straight portion of said wire spring being nested under said body;

a U bolt engaging said keeper and positioned parallel to said cable compression member and cooperating with said spring for captivating said keeper to said body; and said U bolt and said spring cooperating to confine said cable compression member of said keeper to limited arcuate parallel movement with respect to said cable receiving groove, said U bolt applying maximum force to said cable at the end of said cable receiving groove closest to said clevis.

* * * * *